United States Patent Office 3,260,572
Patented July 12, 1966

3,260,572
COUNTERCURRENT LIQUID-LIQUID
EXTRACTION APPARATUS
Pierre Faugeras, Montrouge, Paul Minart, Fontaine, Pierre Pouchot, Lancey, and Xavier Talmont, Antony, France, assignors to Commissariat a l'Energie Atomique, Paris, France
Filed May 15, 1962, Ser. No. 195,367
Claims priority, application France, May 19, 1961, 862,317; Apr. 19, 1962, 895,118; Apr. 20, 1962, 895,306
3 Claims. (Cl. 23—270.5)

In liquid-liquid extractions, it is already known to employ batteries of mixer-settlers. In this type of installation, the mixer is a tank in which a motor-driven stirrer effects the mixing of the two phases. The settler is also a tank and the settling of the two phases takes place therein under the action of gravity.

In these plants, the processing time per stage is of the order of 5 to 6 minutes, which can entail serious disadvantages in the case of certain nuclear applications. For example, in the case of the treatment of a solution of irradiated fuel, there takes place during the entire processing period a degradation of one of the liquids, namely the solvent, under the radiation action of the other liquid, namely, the solution which is to be treated.

The present invention has especially for its object to overcome such drawbacks and consists mainly of a plant for liquid-liquid extraction by the counter-current flow process, characterized in that the said plant comprises a number of stages arranged in a cascade, each stage comprising successively an injector nozzle which effects at the same time the mixing of the liquid phases and the injection of the said phases into a cyclone after these latter have been mixed, if necessary a coalescence tube fitted at the upstream end of the said cyclone and connected to this latter, a cyclone of the type designed for liquid-liquid separation, and means combined with the said injector nozzles and working in conjunction with at least one of the fluids introduced at each end of the plant so as to extract the total energy which is necessary for the operation of the said injector nozzles.

However, it can prove advantageous, in the case in which a sufficient pressure is available, to make use of the same driving fluid in all stages and preferably that fluid which has the highest flow-rate.

It is for this reason that the present invention also consists, apart from the aforementioned principal arrangement, of certain other arrangements which are employed preferably at the same time and in various possible combinations, namely:

A certain number of the means combined with the injector nozzles and deriving the energy which is necessary for the operation of the said injector nozzles work in conjunction with one of the two fluids which are fed into the ends of the plant, and the remainder of the said means works in conjunction with the second of the said fluids.

All the means combined with the injector nozzles and deriving the energy which is necessary for the operation of the said injector nozzles work in conjunction with only one of the two fluids which are fed into the ends of the plant.

The plant is provided with means for putting at least one of the fluids which are fed into the ends of the plant under a pressure which is sufficient to provide all the energy which is necessary for the operation of the injector nozzles.

The said cyclone comprises a section for the tangential admission of the mixture, in which the flow of this latter has a Reynolds number which, in respect of the said section, is less than 7000, an axial outlet through which flows the phase with a lower flow rate and which is fitted with a regulating device, an axial outlet through which flows the phase with a preponderant flow rate and which is fitted with a finishing-separation device, the shape of the said cyclone near the said outlet fitted with the finishing device being convergent when the heavy phase is withdrawn therefrom, the regulating device being constituted by a needle float-valve, and the finishing device being constituted by a tube which is co-axial internally with the said cyclone and terminates in a perforated cone fitted with a packing, the phase which is separated in the finishing device being conveyed directly to the other end of the cyclone at the level of the regulating device.

The said coalescence tube is provided with at least one sloping wall over which the fine drops of the heavy phase of the dispersion run downwards while increasing in size, whereas the main stream of the said dispersion flows from the bottom to the top of the said coalescence tube.

The said coalescence tube comprises two conical portions, the bases of which are joined together and the vertices of which are connected respectively to an inlet pipe and an outlet pipe.

The two said conical portions of the said coalescence tube have different conicities, the angle of slope of the lower conical portion being greater than that of the upper conical portion.

The use in accordance with the invention of an injector nozzle as a mixer and the use of a cyclone as a separator makes it possble to produce almost instantaneously an intimate mixture of the two phases followed by their rapid separation, these two operations lasting for a period of the order of one minute, thereby offering the advantage in nuclear applications of being beneficial from the point of view of criticality and of limiting the degradation of the solvent under the action of radiation of the irradiated solution treated.

In addition, the use of the injector nozzle on the one hand as a mixing element and on the other hand as a driving element for the purpose of ensuring the hydraulic operation of each stage makes it possible respectively to dispense with the need for any movable stirring device and also to eliminate all moving machinery, for example the circulating pumps which have hitherto been necessary at each stage, with the result that the plant as a whole operates solely by hydraulic means, the only moving parts in the plant being constituted by the control valves at the ends of the plant.

The present invention will in any case be more readily understood by means of the complementary description which follows below and by means of the accompanying drawings, both the said complementary description and drawings being given solely by way of example without any limitation being implied.

In the accompanying drawings, FIG. 1 is a schematic view of a plant in accordance with the invention.

Figure 1:
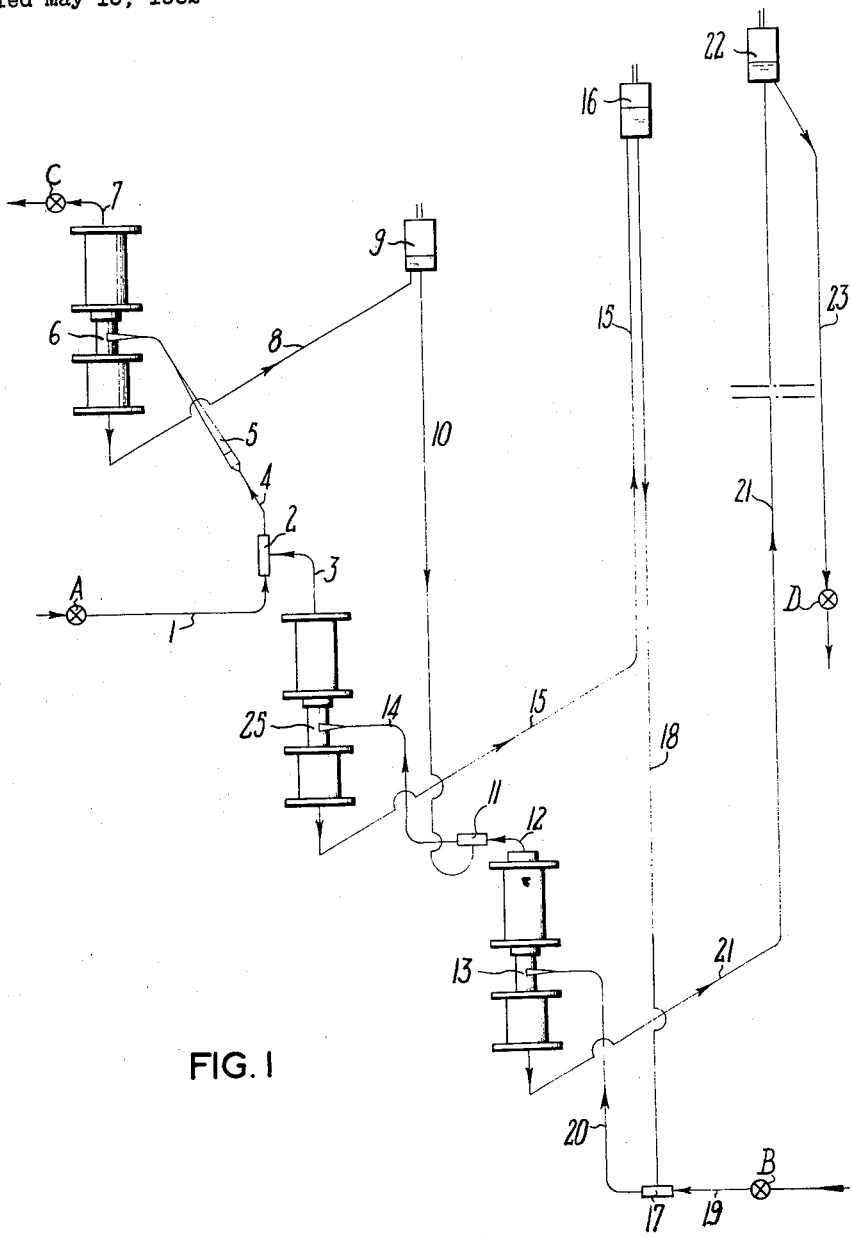

There can be seen in FIG. 1 one form of execution of the plant, which is chosen by way of example and shows a three-stage liquid-liquid extraction plant designed in particular for the treatment of a solution of uranyl nitrate, each stage being essentially constituted by a cyclone and an injector nozzle.

In this example of construction of a plant in accordance with the invention, the aqueous phase to be treated is fed at A into the first stage under a suitable pressure (by means, for example, of a constant-level tank) and passes through the conduit 1 into an injector nozzle 2, in which the aqueous phase constitutes the driving fluid. The said aqueous phase then mixes in the said injector nozzle with the second phase which is constituted by a solvent supplied through a conduit 3 of the preceding stage of the plant.

The mixture which is thus formed in the injector nozzle 2 and which comprises very fine droplets of heavy phase is carried away under the action of the injector nozzle into a coalescence tube 5 which will be described below.

The said tube or tubular chamber 5, which is of bi-frustoconical shape and is inclined at an angle of approximately 45°, produces as a result of the increase in cross-sectional area on the one hand and of the angle of slope of the tube on the other hand, a segregation of heavy-phase droplets which coalesce on the bottom generator line. This droplets grow larger, run downwards and are re-cycled in the main stream. The swelling of the heavy-phase droplets has the effect of considerably increasing the yield of the subsequent operation in the cyclone 6.

As it passes out of the inclined chamber, the mixture is injected, again under the driving action of the injector nozzle 2, into the cyclone 6 of the first stage in which a first separation of the two phases is effected. The aqueous phase (heavy phase) is withdrawn from the bottom outlet of the cyclone and the solvent (light phase) is in turn withdrawn at the top outlet of the cyclone and passes out of the plant through the conduit 7.

This arrangement of the inclined chamber 5 between the injector nozzle and the cyclone is particularly advantageous in this stage of the plant inasmuch as it provides a means of obtaining both excellent separation in the cyclone 6 and consequently a solvent passing out of the plant in which the proportion of the entrainment of heavy phase is less than 1/1000 by volume.

The cyclone 6, which provides automatic regulation of the flow rates and is particularly suited to the liquid-liquid separation process, can be, for example, of the type which will be described below.

As it flows out of the cyclone 6, the aqueous phase is fed through a conduit 8 into a free-surface compensation chamber 9, the position of which is so designed that the exit pressure of the heavy phase of the cyclone 6 is lower than the exit pressure of the light phase but is nevertheless higher than a pre-established minimum value, this double condition being necessary in order to prevent the choking of the cyclone and to ensure the correct operation of its regulating float-valve. It will be readily understood that the height of the compensation chamber 9 determines, through the head pressure in the conduit 8, the pressure at the lower outlet of cyclone 9. If this head pressure is too great the heavier aqueous phase would flood the cyclone separator 6. On the other hand, if the head pressure is not great enough, it would be impossible to control the exit flow of the heavy phase and thereby establish an operational equilibrium of the respective phases within the separator. As will be understood more readily upon reading the intended operation of the float control valve as described hereinafter, such a low pressure at the exit orifice would tend to cause an intermittent batch-release type of action by the control valve.

The aqueous phase then penetrates through the conduit 10 into the injector nozzle 11 of the second stage of the plant in which the said aqueous phase constitutes the entrained phase, while the driving phase of the said injector nozzle 11 is constituted by the light phase which enters the injector nozzle through the conduit 12 after leaving the cyclone 13 of the third stage.

The two phases mix in the injector nozzle 11 and are injected under the driving action of the said injector nozzle into the cyclone 25 of the second stage through the conduit 14.

The cyclone 25, which is of the same type as cyclone 6 of the first stage, effects the separation of the mixture, the light phase being withdrawn at the top portion of the cyclone and injected through the conduit 3 into the injector nozzle 2 as previously indicated.

The aqueous phase or heavy phase is withdrawn at the bottom outlet of the cyclone 25.

As it flows out of the cyclone 25, the said aqueous phase flows through the conduit 15 into a free-surface compensation chamber 16 having the same function as the chamber 9 which has been described above and the position of which is so designed that the exit pressure of the heavy phase of cyclone 25 is higher than a minimum value and lower than the exit pressure of its light phase, this latter being relatively high by reason of the pressure drop in the first stage.

In accordance with the same principle of operation as the second stage, the aqueous phase is fed into the injector 17 of the third stage of the plant through the conduit 18 in which the said aqueous phase constitutes the entrained phase, while the driving phase of the injector nozzle is constituted by the solvent (light phase) as it enters the plant through the conduit 19 under a suitable pressure ensured by means, for example, of a constant-level tank which is disposed at a height of approximately 7.50 m.

The two phases mix together in the injector nozzle 17 and the mixture is injected under the action of the said injector nozzle through the conduit 20 into the cyclone 13 of the third stage in which the separation of the mixture is effected. The said cyclone 13 is of the same type as the cyclones 25 and 6 which have been previously described.

The light phase is withdrawn at the top outlet of the cyclone 13 through the conduit 12 and enters as a driving fluid into the injector nozzle 11 as already described.

The aqueous phase or heavy phase is withdrawn at the bottom outlet of the cyclone 13, and is fed from this latter, through the conduit 21, into a compensation chamber 22 which serves the purpose of regulating the exit pressure of the heavy phase of the cyclone 13, in the same manner as the chambers 9 and 16 which have been previously described in relation to the cyclones 6 and 25 of the first and second stages.

As it leaves this third stage, the said aqueous phase has a very low concentration and is passed out of the plant through the conduit 23, its treatment being completed.

The inputs and outputs of liquids in the plant are regulated by means of valves A, B, C, and D.

The energy which is necessary for the operation of the plant (in particular the energy absorbed by the three injector nozzles) is derived from the hydraulic energy of fluids introduced in the plant at 1 and 19, namely such fluids as, in the example of application chosen, the solution of uranyl nitrate and the solvent.

It will therefore be necessary to introduce these latter under a pressure which is sufficient to ensure that they have available the energy required for the operation of the injector nozzle 2—the driving fluid being constituted by the solution which is introduced at 1—and for the operation of the injector nozzles 11 and 17—the driving fluid being constituted by the solvent introduced at 19.

In the example as herein described and illustrated, the driving fluid of the injector nozzle 2 of the first stage is constituted by the heavy phase (solution to be treated), whereaes the driving fluid of the two other injector nozzles 11 and 17 is constituted by the light phase (solvent), the purpose thereof being to distribute the pressure drop due to the injector nozzles over both fluids.

In those cases in which sufficient pressure is available, it is possible, however, to ensure the operation of the three injector nozzles by means of only one of the two fluids, and preferably that fluid which has the highest rate of flow. This would make it necessary in the present example to employ the light phase which leaves the cyclone through the conduit 3 as the driving fluid of the injector nozzle 2 by feeding the said light phase into the end of this latter, whereas the aqueous phase which enters the plant through the conduit 1 would be the entrained fluid which is fed from the side into the injector nozzle 2.

In one example of utilization of the plant in accordance with the invention, there was treated a solution of uranyl nitrate composed of 300 g./l. of uranium, free acidity 2 N nitric, the solvent being 20% tributyl phosphate in dodecane.

In this experiment, there was obtained a concentration of 67.5 g./l. of the aqueous phase at the bottom outlet of the cyclone 6 of the first stage and a charge of 67.07 g./l. of solvent at the top outlet of this same cyclone 6.

The concentration of the aqueous phase drops to 1.58 g./l. at the bottom outlet of the cyclone 25 of the second stage of the plant, and finally drops to 0.039 g./l. at the bottom outlet of the cyclone 13 of the third stage of the plant.

The results obtained very substantially correspond to three theoretical stages and, in particular, the concentration of the aqueous phase which issues from the third stage (0.039 g./l.) shows the excellent yield of the plant in accordance with the invention, to which must be added the advantages offered by the short fluid-processing time per stage and the absence of any moving part along the path of the fluids in the plant.

The plant could be provided with a number of stages greater than 3, and in certain cases in which there are a large number of stages and in which the pressure of entering fluids is no longer sufficient to ensure the operation of the unit, it would accordingly be possible to divide the plant into a number of groups with a circulating pump between each group.

Figure 2:
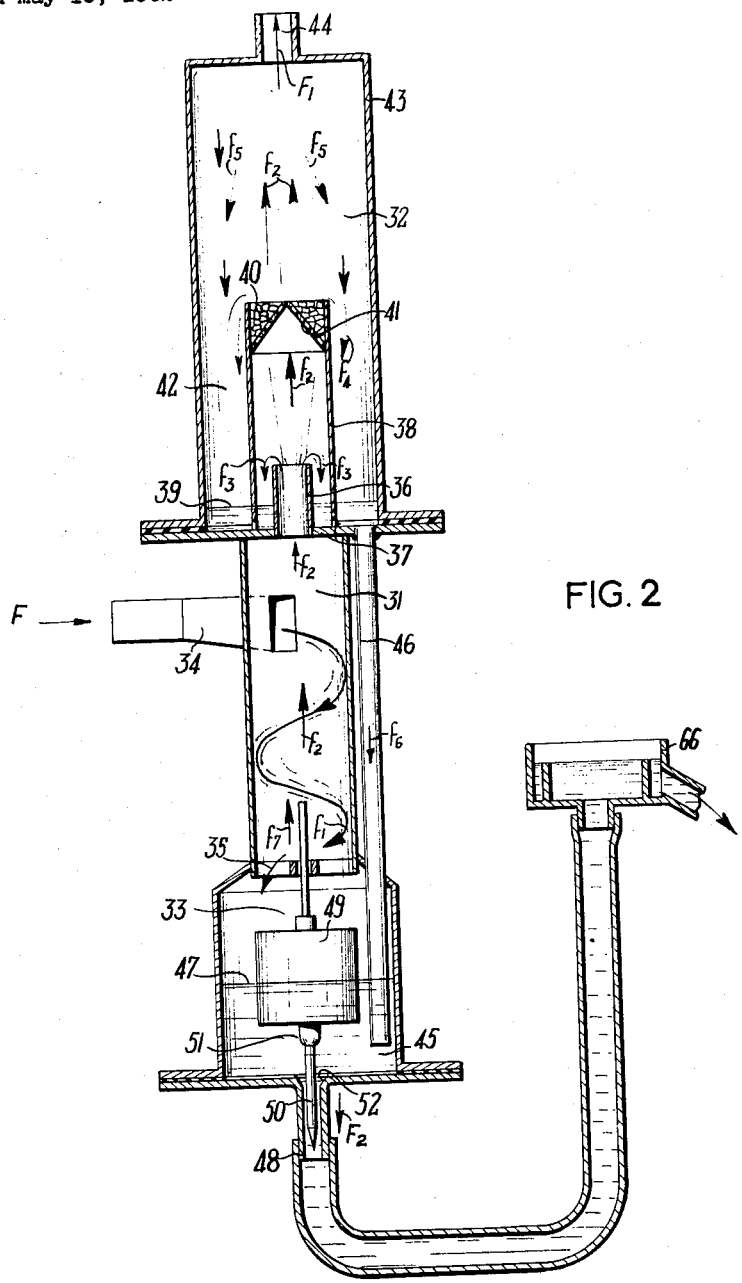
FIG. 2 is a view in axial cross-section of a cyclone in accordance with the invention for the separation of two phases of a dispersion in which the light phase is preponderant.

There can be seen in FIG. 2 a cyclone in accordance with the invention for the separation of two phases of a dispersion in which the light phase is preponderant.

The apparatus is composed of a cylindrical hydrocyclone 31, a cylindrical chamber 32 for the finishing-separation which is disposed at the top outlet of the cyclone through which is withdrawn the light phase having a preponderant flow rate, and a cylindrical settling and regulating chamber 33 disposed at the bottom outlet of the cyclone through which is withdrawn the heavy phase having a lower flow rate.

The liquid-liquid dispersion to be separated and containing for example 70% by volume of the light phase and 30% by volume of the heavy phase is fed into the cyclone in the direction of the arrow F through a tangential inlet 34. This injection is effected at a flow-velocity corresponding to a Reynolds number which, in respect of this section, is less than 7000. The heavy phase, the path of which is indicated by the arrows $f_1$ is centrifugalized against the walls and runs downward in a rotational or gyratory motion, and then flows into the bottom chamber 33 through the opening 35 which is formed by a spider or star-shaped member having a profile so designed as to reverse the direction of rotation of flow and thus to reduce the rotational motion to zero.

The light phase which is subjected to a centripetal action (as shown by the arrow $f_2$) is directed upward into the central portion of the cyclone and reaches the top chamber 32 through a central chimney 36.

This separation of the two phases under the action of centrifugal force and of gravity is fairly complete and the top and bottom chambers into which the said phases pass essentially have the function both of carrying out a finishing separation and of regulating the apparatus.

A first finishing separation is carried out at the top portion of the central chimney 36, where a part of the heavy-phase droplets entrained in the upward jet of the light phase fall back in the direction of the arrows $f_3$, outside and towards the base of the said central chimney, so as to run out through the orifices 37 of the lower cylinder 38 towards the base of the chamber at 39.

When issuing from the central chamber, the upward jet of the light phase $f_2$ is directed into the top portion of the cylinder 38 and passes through a packing 40 which rests on a perforated cone 41.

The light-phase jet remains centered in that axis in which the loss of pressure is lowest and there takes place a second finishing separation which is fairly substantial inasmuch as the heavy-phase droplets which are entrained coalesce in the packing and form on the surface of this latter large drops which run down in the direction of the arrows $f_4$ toward the base 39 of the chamber, and through the annular space 42.

As it passes out of the packing 40, the light-phase jet enters the top portion of the chamber 32 which is formed by a cylinder 43 and in which, by reason of the decreasing velocity near the walls, there takes place in the immediate vicinity of the said walls a third finishing separation constituted by a settling of heavy-phase droplets which are still contained in the light-phase jet and which fall down again towards the base of the chamber at 39 in the direction of the arrows $f_5$ so as to join the heavy-phase droplets previously deposited as a result of the two first finishing separations.

The upward jet of the light phase which is thus separated from the heavy phase passes out in the direction of the arrow $F_1$ through the central orifice 44 formed at the top of the chamber.

The heavy-phase droplets which are recovered at the base of the top chamber at 39 are directed towards the bottom of the lower chamber at 45 through the laterally offset conduit 46 and in the direction of the arrow $f_6$ since the pressure inside the finishing chamber is always maintained at a higher value than that of the regulating chamber, this being a requisite condition of operation of the apparatus.

The main stream of the heavy phase which flows out at the base of the cyclone through the opening 35 formed by the shaped spider is directed into the bottom cylindrical chamber 33 in which, by reason of the larger cross-sectional area, there takes place a settling of the heavy phase with an interface at 47, and the small quantity of light phase entrained flows upwards in the direction of the arrow $f_7$ into the axial portion of the cyclone so as to subsequently reach the top chamber 32 together with the light phase of the cyclone and then to pass out together with the main light-phase jet through the top orifice 44 in the direction of the arrow $F_1$.

The heavy phase which is collected at the bottom of the chamber 33 is withdrawn in the direction of the arrow $F_2$ along a conduit 48 in the bottom.

The chamber 33 is fitted with a float 49 of cylindrical shape which floats at the level of the interface 47 and which is integral with a cylindrical rod 50, the position of which in the interior of the conduit 48 has the effect, as a result of a variation in pressure-drop, of regulating the flow of the heavy phase in such manner that there is accordingly obtained a precise distribution of the delivery rates as corresponding to the respective feed rates. The closing of the outlet 48 which takes place at the time of starting the apparatus or in the event of possible failure of the supply, is effected by the application of the obturator 51 against its seating 52 in the bottom position of the float.

The float operates as follows:

As and when the interface level drops, the float progressively closes off the heavy-phase out-flow, thereby preventing any further drop in level. If the resulting reduction of flow is not sufficient to stop the interface from dropping, the float will completely close off the outlet when reaching the limit of its travel, whereupon the interface will rise again. When the interface reaches a sufficient level, the float is subjected on the one hand to a lifting force $F_A$ which results from the Archimedean thrust and from the weight of the float and, on the other hand, to a suction force which tends to hold the said float against the orifice, namely $\Delta p.S$, $S$ being the cross-sectional area of obturation, $\Delta p$ being the difference in pressure on each side of the orifice.

In order that the float should be lifted again, it is necessary to ensure that:

$$F_A > \Delta p.S$$

It can be seen that it is advantageous to have:

(1) a float having a density which is slightly greater than that of the light phase
(2) a float having a sufficient volume
(3) an outlet cross-sectional area S which is as small as possible.

The cross-sectional area S has a minimum value, however, and in fact creates a pressure drop which must be of a sufficiently low order to permit the flow of the heavy phase to take place.

The out-flow from the regulating chamber 33 is effected from the outlet 48 of the regulating chamber 33 into a movable constant-level tank 66, thereby providing the means of varying $\Delta p$.

When the value $\Delta p$ has been suitably regulated by causing the position of the tank 66 to vary, the float follows the movements of the interface, thereby effecting the automatic regulation of the apparatus.

Figure 3:
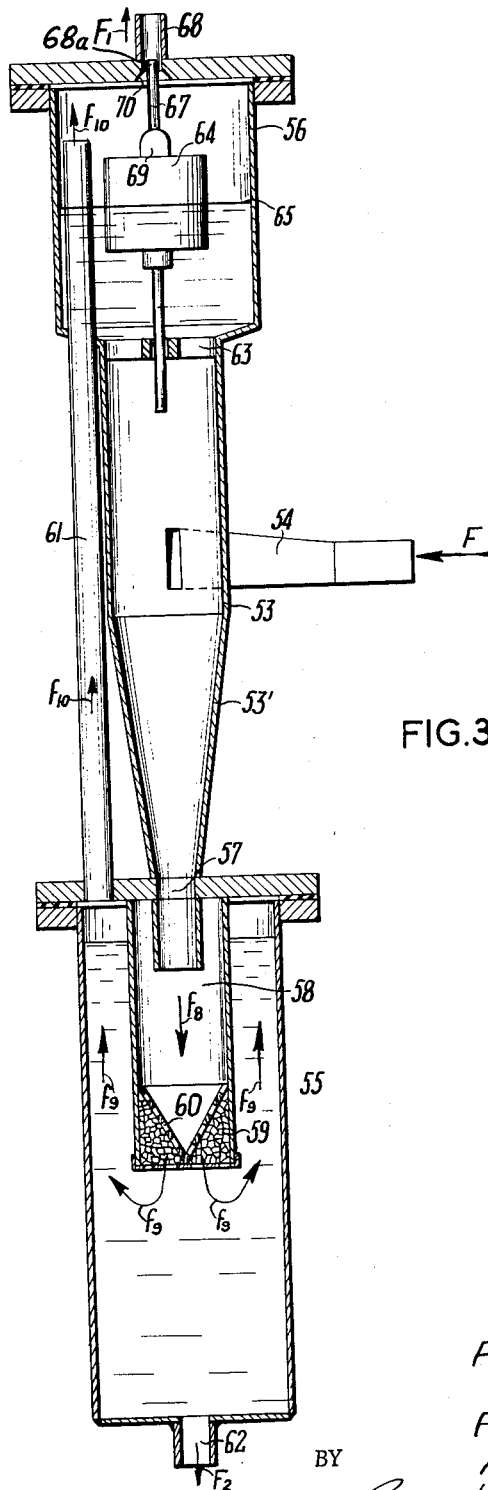
FIG. 3 is a view in axial cross-section of a cyclone in accordance with the invention for the separation of two phases of a dispersion in which the heavy phase is preponderant.

FIG. 3 illustrates an arrangement of the apparatus for the separation of the components of a dispersion in which the heavy phase is preponderant.

In this case, the regulating device is located inside the chamber which is disposed at the top outlet of the cyclone through which the light phase is withdrawn, the flow rate of the said light phase being lower than that of the heavy phase, (for example, light phase throughout: 30%; heavy phase throughout: 70%).

The apparatus is composed of a cyclone 53 of cylindro-conical shape with tangential admission of the liquid-liquid dispersion at 54.

The cyclone tapers towards the bottom at 53' with a view to bringing the centrifugalized heavy phase into the axis of the said cyclone in the vicinity of the lower outlet 57 of this latter, there being disposed beneath the said outlet a finishing chamber 55.

In addition, the height of the cylindrical portion of the said cyclone above the tangential intake 54 is sufficient to ensure that the rotational effect which takes place at the said intake no longer has any appreciable influence in the vicinity of the upper outlet 63 of the cyclone, there being located above the said upper outlet a regulating and settling chamber 56.

In accordance with the invention, the finishing chamber 55 is located at the outlet 57 of the cyclone from which is withdrawn the phase which has a preponderant rate of flow whereas the regulating and settling chamber 56 is located at the outlet 63 of the cyclone from which is withdrawn the phase which has a lower rate of flow.

The heavy phase is centrifugalized against the walls of the cyclone and runs down so as to pass out of the cyclone through the lower central orifice 57 and then flows in the direction of the arrow $f_8$ through a central chimney into a cylindrical chamber 58 disposed inside the bottom chamber 55.

The downward jet of heavy phase accordingly passes through a packing 59 which is disposed around a perforated cone 60, thereby producing a finishing separation.

In point of fact, those portions of the light phase which are entrained coalesce on the underface of the packing and move upwards again in the direction of the arrows $f_9$ to be subsequently forced up, as a result of the pressure of the bottom finishing chamber, towards the top regulating chamber 56 and through the laterally offset conduit 61 in the direction of the arrows $f_{10}$.

In fact, in accordance with the designed conditions of operation of the apparatus, the pressure inside the finishing chamber is always higher than that of the regulating chamber.

The purified heavy phase is withdrawn in the direction of the arrow $F_2$ through the outlet 62 at the base of the bottom chamber 55.

The light phase, the separation of which is carried out in the cyclone, is directed upwards in the cenrtal portion of this latter and enters the top regulating chamber 56 through the shaped orifice 63, the said orifice having cross-arms which are so orientated as to reduce the rotational velocity of the jet to zero.

In the said chamber 56, there takes place a settling of the light phase with formation of an interface 65.

At 64, a float or float-valve which floats at the level of the interface 65 is integral with a rod 67, the position of which inside the evacuation conduit 68 regulates by means of a variation in the pressure-drop the flow rate of the light phase, thereby ensuring a regulation of the apparatus in such manner that the distribution of delivery rates both of the heavy phase and the light phase corresponds to the respective feed rates.

The light phase is thus withdrawn through the orifice 68a in the direction of the arrow $F_1$.

The closure of the said outlet orifice 68a, which takes place as in the previous example, at the time of starting up of the apparatus or in the event of a possible failure of the supply, is effected by the application of the obturator 69 against its seating 70.

The regulation of the pressure at the outlet 68a of the regulating chamber 56 is effected as in the previous example, by means of a movable constant-level tank, which has not been illustrated in this figure.

Figure 4:
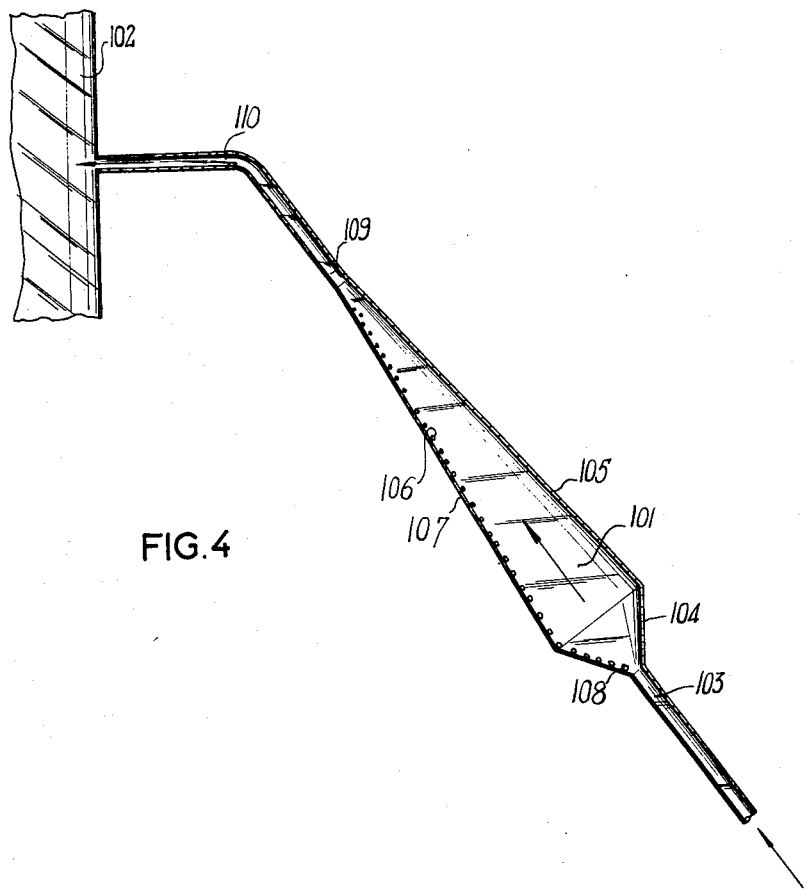
FIG. 4 is a view in cross-section of a coalescence tube in accordance with the invention.

There has been shown in FIG. 4 an example of a coalescence tube in accordance with the invention, which has been illustrated schematically in sectional front view.

There can be seen in this figure an inclined chamber 101 which is designed to be interposed in the feed system of a cyclone 102 and is intended for the liquid-liquid extraction of two phases in dispersion.

The main flow stream which is formed by the mixing of the two phases arrives through a conduit 103 and penetrates into the bottom of the chamber 101 which is inclined at an angle of approximately 50°, for example, and is formed by two portions of cones 104 and 105.

The main flow stream passes upwards along the axis of the chamber 101, and under the influence of the increase in cross-sectional area, the heavy-phase droplets 106 settle on the bottom generator line 107 of the chamber, where they increase in size while running downward so as to be recycled at 108 in the main stream in a pulsating motion, and are discharged with the said main stream through the top end 109 of the chamber and then flow through the conduit 110 into the cyclone 102.

The heavy phase of the dispersion is thus composed of large droplets as it enters the cyclone separator 102, which has the effect of increasing the separating efficiency of this apparatus to a considerable extent.

As will be readily understood and as has in any case been brought out by the foregoing, the invention is in no way limited to those forms of embodiment which have been described and illustrated, but includes within its scope all alternative forms.

What we claim is:

1. In a plant for liquid-liquid extraction, a plurality of units disposed in a cascade-type series relation, each of said units including: a cyclone type separator having an inlet, and adapted for separating comparatively light and comparatively heavy liquid phases supplied co-currently to said inlet, with one of said liquid phases being more preponderant and the other less preponderant, said separator further having a first axial outlet for said more preponderant liquid phase and a second axial outlet for said less preponderant liquid phase; an injector nozzle connected to said separator inlet for both mixing the different liquid phases and co-currently injecting the same into said separator; and means connecting said injector nozzle with the inlet of said separator, including an inclined coalescence tube mounted between said injector nozzle and said separator inlet for separating and coalescing droplets of the comparatively heavy liquid phase and effecting entrainment of the coalesced droplets in the flow from the injector nozzle to said inlet, said coalescence tube including two frusto-conical sections united at their enlarged ends and tapering inwardly therefrom, the enlarged portion of said tube effecting said separation of droplets, which droplets are then coalesced by flowing downwardly on the inclined wall of one of said sections; a first conduit means connected to the injector nozzle of a first one of said units disposed at one end of said series for introducing a first one of said liquid phases to the separator of said first unit; second conduit means connected between one of the axial outlets of each separator and the injector nozzle of the next succeeding unit, from said first unit to the last unit of said series, for transmitting said one liquid phase between said units; a third conduit means connected to the injector nozzle of said last unit of said series for introducing the other of said liquid phases to the separator of said last unit; fourth conduit means connected between the other of the axial outlets of each separator and the injector nozzle of the next succeeding unit, from said last unit to the first of said series, for transmitting said other liquid phase between said units, whereby said other liquid phase is transmitted in a countercurrent direction with respect to said first liquid phase; adjustable regulator means associated with said second axial outlet of each separator and the conduit means connected thereto for automatically controlling the discharge pressure of the less preponderant liquid phase flowing therethrough, each said means including: a needle float valve mounted in said second axial outlet for controlling the flow therethrough; and adjustable means arranged for establishing a preselected pressure on the downstream side of said second axial outlet in excess of the discharge pressure at the associated first axial outlet; and a finishing separation device positioned upstream of said first axial outlet of each separator, each such device including a tube mounted coaxially within the separator and terminating in a perforated cone fitted with a packing.

2. The plant of claim 1 wherein at least one of said liquid phases is introduced at a sufficient pressure to operate all of the said injector nozzles.

3. A plant in accordance with claim 1 wherein the lower most of said sections is relatively sharply tapered with respect to the uppermost section.

References Cited by the Examiner
UNITED STATES PATENTS

| | | | |
|---|---|---|---|
| 1,373,720 | 4/1921 | Gish | 210—114 X |
| 1,519,479 | 12/1924 | Bennerfeld | 210—114 |
| 1,792,003 | 2/1931 | Dickey | 23—270.5 X |
| 2,381,760 | 8/1945 | Latham. | |
| 2,759,801 | 8/1956 | Yeager | 23—271 |
| 3,017,767 | 1/1962 | Mossberg | 210—512 X |

NORMAN YUDKOFF, *Primary Examiner.*

S. J. EMERY, *Assistant Examiner.*